May 26, 1931.  E. GLOVER ET AL  1,806,624
TWO-ROW CORN PICKER
Filed July 26, 1928    5 Sheets-Sheet 4

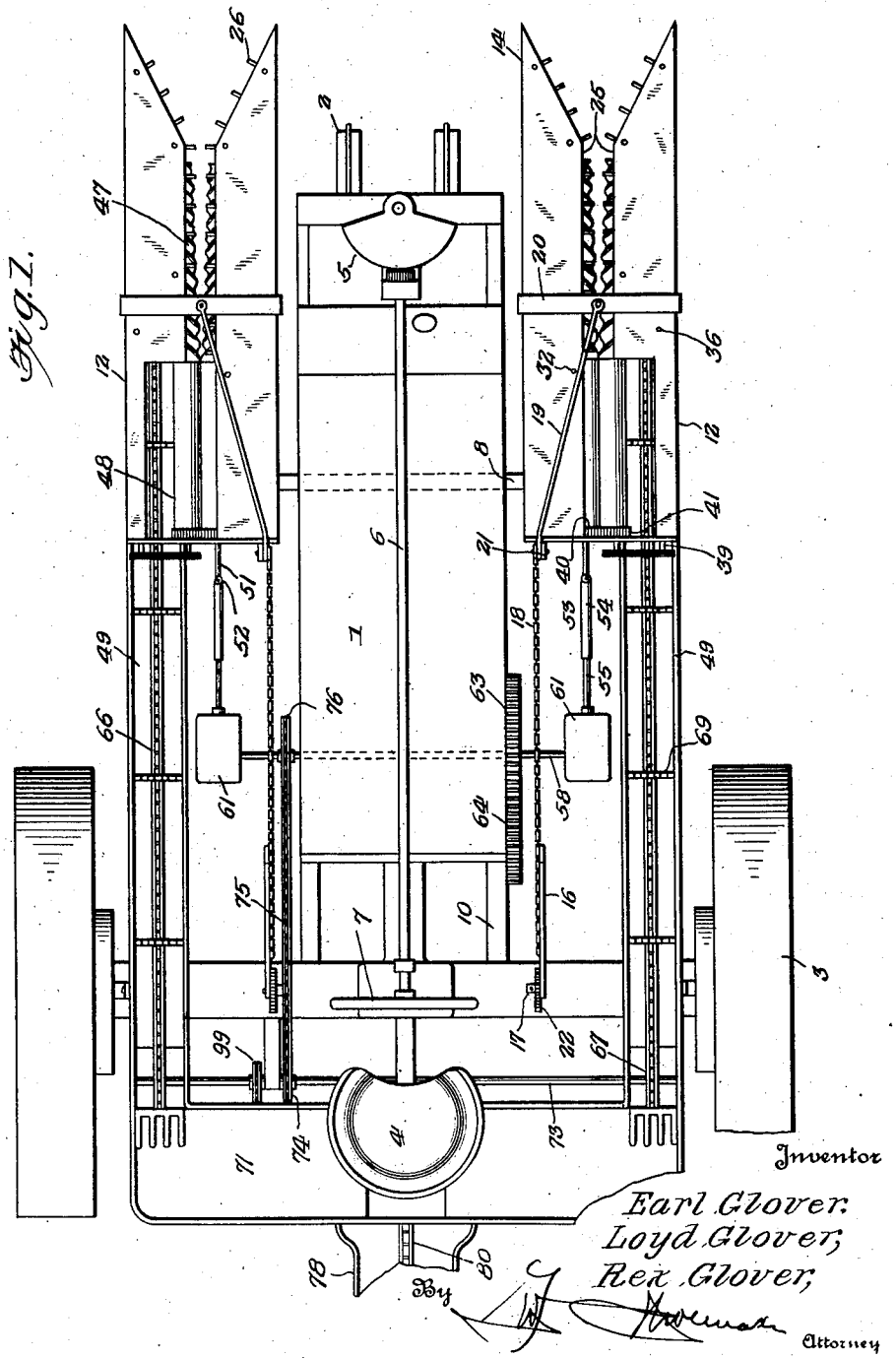

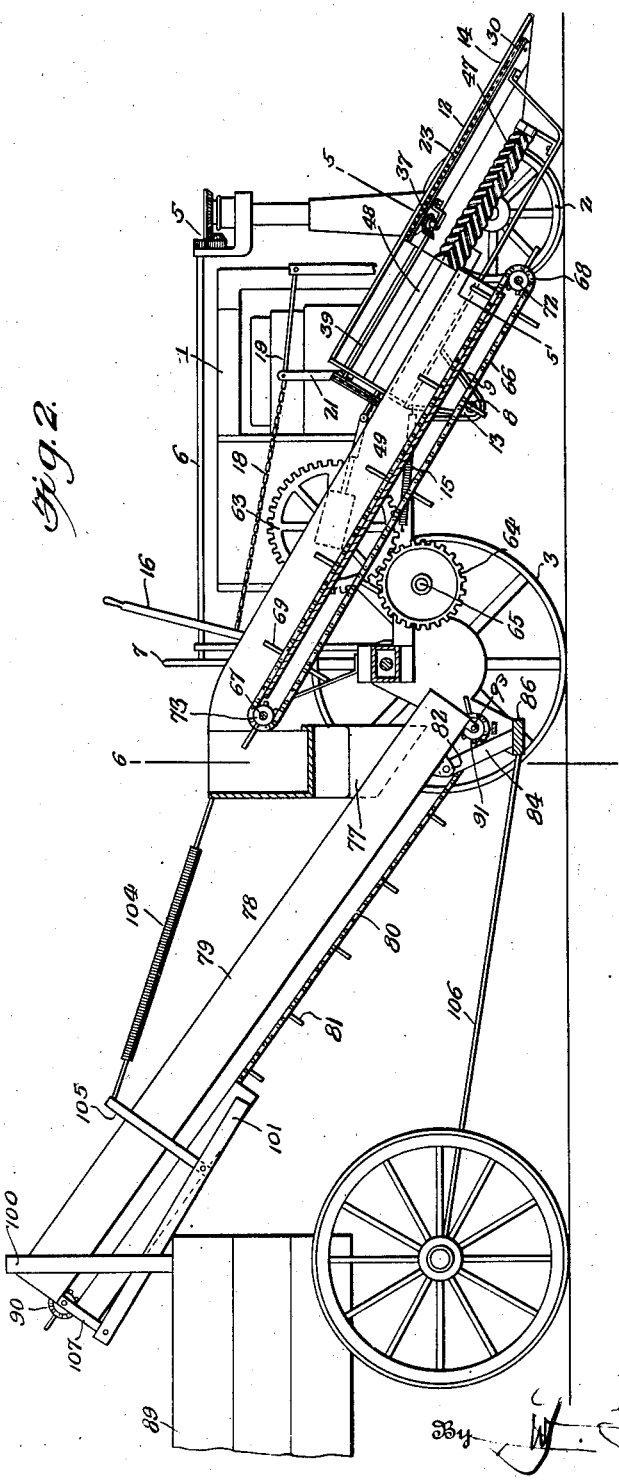

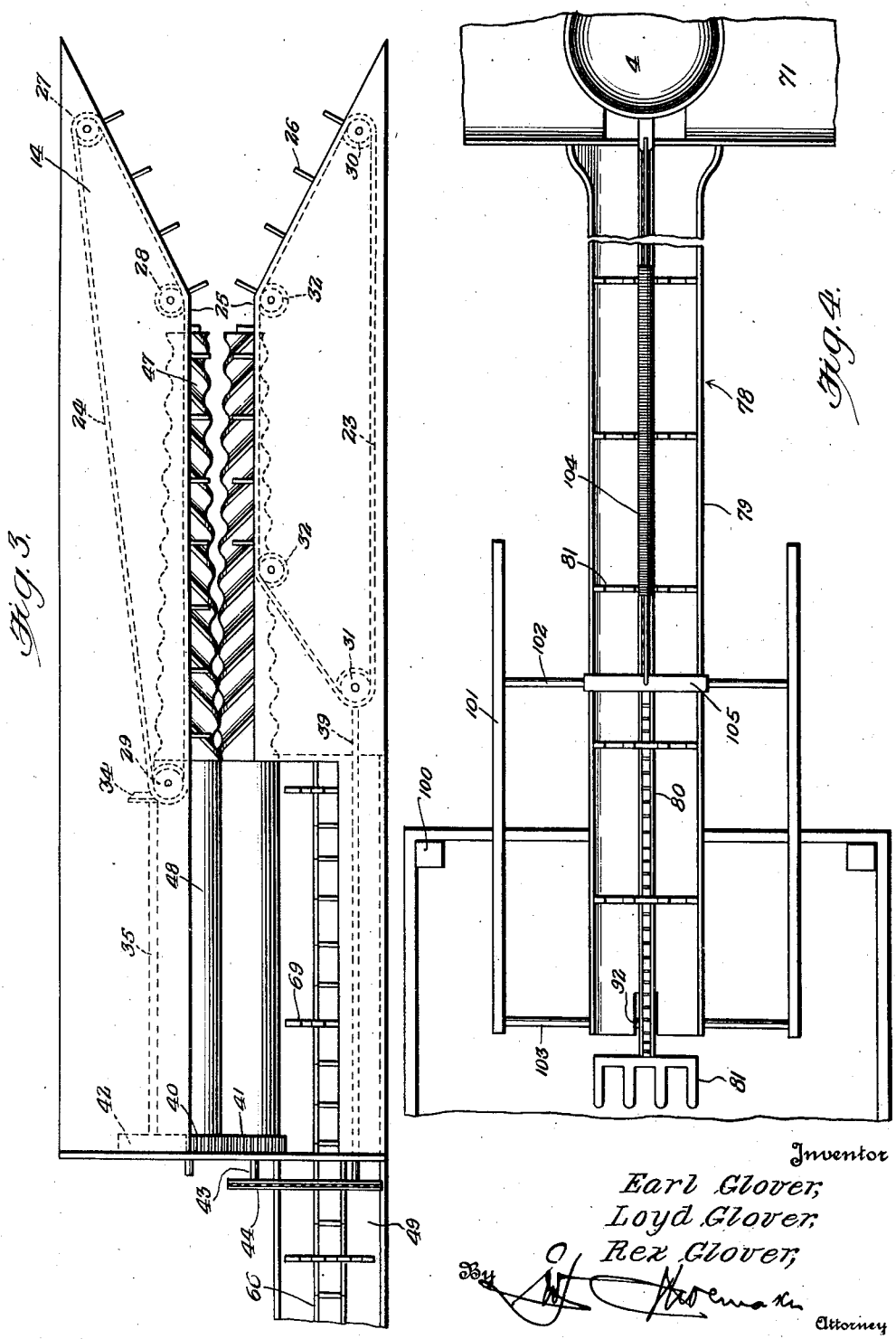

Inventor
Earl Glover,
Loyd Glover,
Rex Glover,

By
Attorney

May 26, 1931.  E. GLOVER ET AL  1,806,624
TWO-ROW CORN PICKER
Filed July 26, 1928   5 Sheets-Sheet 5
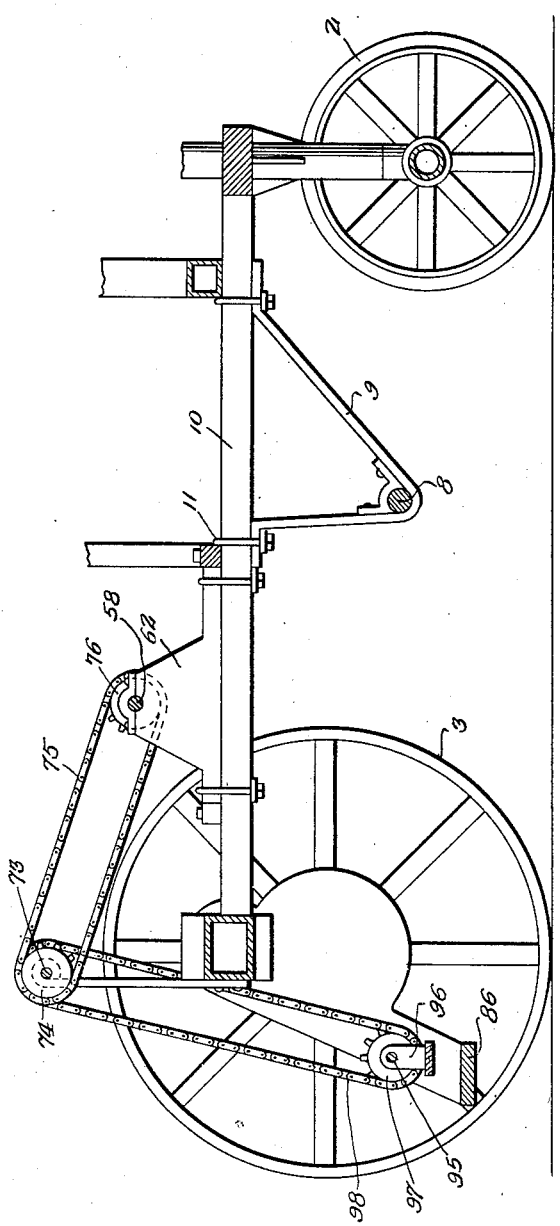
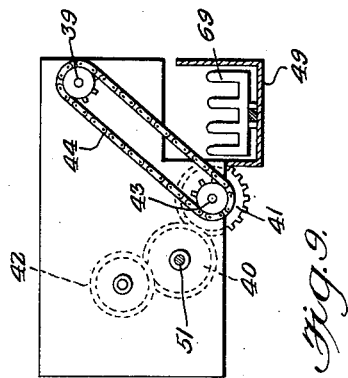
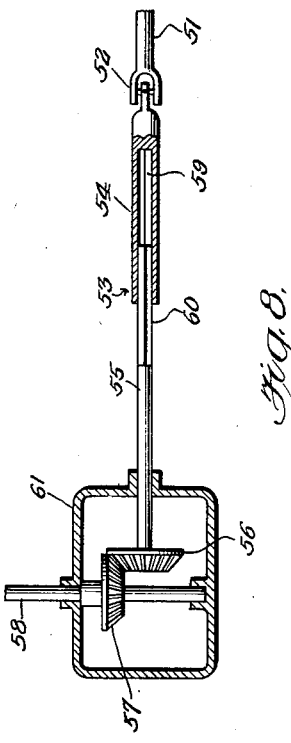
Inventor
Earl Glover,
Loyd Glover,
Rex Glover,
By
Attorney Patented May 26, 1931

1,806,624

UNITED STATES PATENT OFFICE

EARL GLOVER, LOYD GLOVER, AND REX GLOVER, OF COMSTOCK, NEBRASKA

TWO ROW CORN PICKER

Application filed July 26, 1928. Serial No. 295,486.

The invention relates to a two row corn picker.

An object of the present invention is to provide a two row corn picker which is adapted to gather the stalks of two rows of corn and snap the ears from the stalks while the latter are left standing.

A further object of the invention is to provide a two row corn picker equipped with a tractor for furnishing the power for operating the corn pickers and for propelling the machine and provided at opposite sides of the tractor with corn pickers adapted to be raised and lowered either simultaneously or independently to permit them to run along the ground and to be elevated to permit either or both of the corn pickers to clear an obstruction.

It is also an object of the invention to provide a two row corn picker of this character provided with conveying mechanism for carrying away the ears of corn from the gathering and snapping mechanism and for delivering the snapped ears into a wagon and to permit the same to be drawn along with the two row corn picker in rear of the tractor and behind the machine so that there will be no down row at any stage of the operation and the loss incident to down rows eliminated.

Another object of the invention is to provide a two row corn picker having gathering arms or portions spaced sufficiently to enable the machine to handle two rows of corn even where the rows are not uniformly spaced.

With these and other objects in view, the invention consists in the construction and novel combination and arrangement of parts hereinafter described, illustrated in the accompanying drawings and set forth in the claims hereto appended, it being understood that various changes in the form, size and minor details of construction, within the scope of the claims, may be resorted to without departing from the spirit of the invention or sacrificing any of the advantages thereof.

In the drawings:—

Figure 1 is a plan view of a two row corn picker constructed in accordance with this invention.

Fig. 2 is a longitudinal sectional view of the two row corn picker, section being taken through one of the side corn pickers and its side conveyor, the rear conveyor being shown in elevation.

Fig. 3 is an enlarged plan view of one of the side corn pickers and a portion of its side conveyor.

Fig. 4 is a plan view of the rear conveyor.

Fig 7 is a longitudinal sectional view of the tractor, parts being omitted to illustrate the arrangement of certain gearing and the pivot of the side corn pickers.

Fig. 8 is a detail sectional view illustrating the construction of the gearing for driving the gathering and snapping rolls.

Fig. 9 is a detail view illustrating the arrangement of the gearing for operating the endless chains of the gathering mechanism.

Fig. 10 is a longitudinal sectional view of one of the gathering and snapping rolls.

Figure 5:
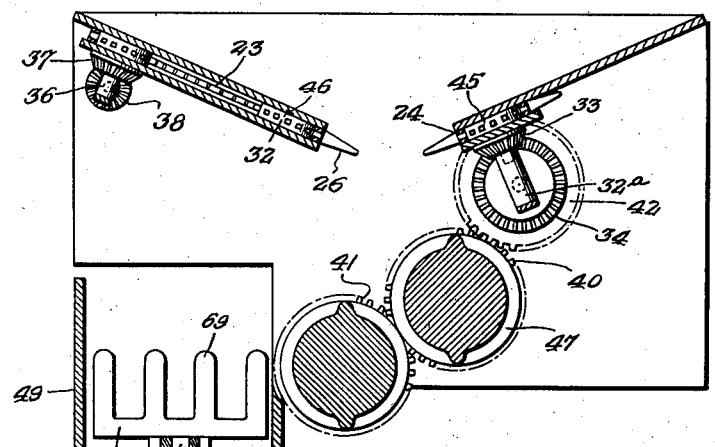
Fig. 5 is a transverse sectional view of one of the side corn pickers taken substantially on the line 5—5 of Fig. 2.

In the accompanying drawings in which is illustrated the preferred embodiment of the invention the two row corn picker comprises in its construction a tractor 1 which may be built of any preferred construction and which is provided with front steering wheels 2 and rear traction or bull wheels 3 and a seat 4 for the accommodation of the driver or operator is provided at the rear of the tractor and steering mechanism 5 of the ordinary construction is provided for controlling the front steering wheels and the said steering mechanism has a longitudinally disposed operating shaft 6 extending into the rear portion of the tractor and provided with a hand wheel 7 located in front of the seat 4 in convenient reach of the operator.

The tractor is provided at a point intermediate of its ends with a transverse pivot 8 mounted in suitable brackets 9 suitably secured to and depending from the tractor frame 10. The brackets are approximately V-shaped and are secured by clevises 11 to the tractor frame, but any other suitable means, may, of course, be employed for securing the brackets 9 to the tractor frame. The pivot 8 extends laterally from the tractor at opposite sides thereof and constitutes a pivot for picker frames 12 which are provided with suitable bearing brackets 13 depending from the picker frames at the rear portions thereof and mounted on the projecting portions of the pivot 8.

The bearing brackets may be of any desired construction and the mounting of the side corn pickers on the transversely disposed pivot 8 of the tractor will permit them to be raised and lowered to arrange their front gathering arms or portions 14 so that the latter may run close to the ground and be lifted either simultaneously or independently to clear an obstruction or for any other purpose. The raising and lowering of the side corn pickers is assisted or facilitated by coiled tension springs 15 which are connected at their front ends to the bearing brackets 13 above the pivot 8 and at their rear ends to the frame of the tractor.

The side corn pickers are raised and lowered by lifting mechanism located at opposite sides of the tractor and having operating levers 16 located within easy reach of the operator. The operating lever 16 is fulcrumed at one end on a suitable bracket 17 and is connected by a cable or chain 18 and a rod 19 with a yoke 20 composed of spaced sides and a transverse connecting portion. The sides of the yoke are suitably secured to the side picker frame at opposite sides thereof and the rod 19 is suitably secured to the transverse portion of the yoke centrally thereof. The rod 19 extends rearwardly and inwardly to a strut bar 21 mounted on the picker frame at the rear end thereof and the said chain 18 and rod 19 are secured at their adjacent ends to the upper ends of the said strut bar. This will give the proper direction to the pull of the connecting chain 18 to enable the operating lever to raise and lower the picker frame.

The operating lever in practice will be provided with a suitable pawl or detent for engaging a toothed segment 22 of the bracket 17 for locking the picker frame in its adjustment. Any other suitable means may, of course, be provided for raising and lowering the pivoted side corn pickers.

Figure 6:
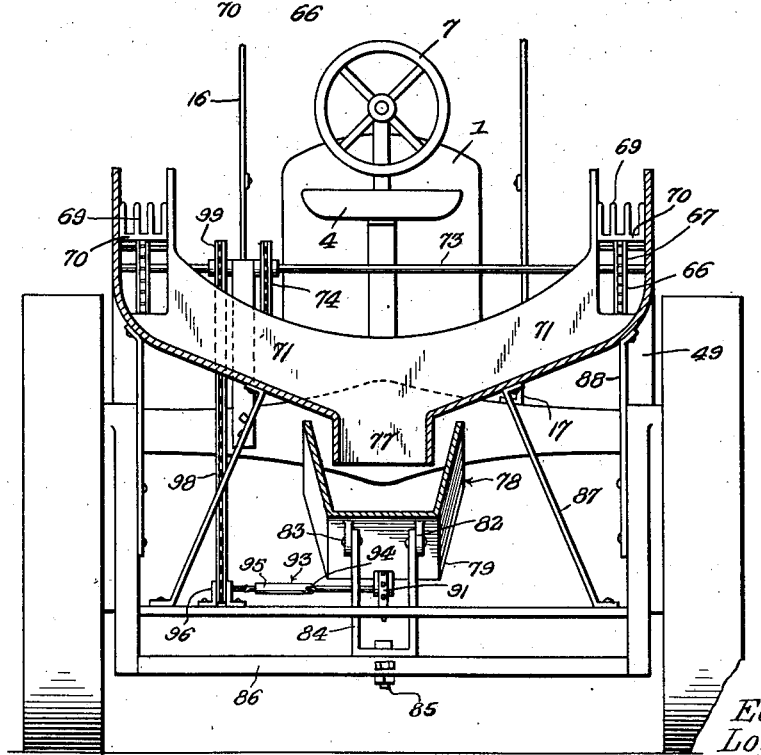
Fig. 6 is a transverse sectional view taken substantially on the line 6—6 of Fig. 2.

Each of the corn pickers which are located at opposite sides of the tractor is constructed identically the same and a detail description of one of the corn pickers is applicable to the other. The frame of the corn picker is composed of two sides set at a lateral inclination as clearly illustrated in Fig. 6 of the drawings and spaced apart to provide a passageway for the standing stalks of corn. The picker frame is also inclined longitudinally and extends upwardly and rearwardly as clearly illustrated in Fig. 2 of the drawings. The front portions of the sides or sections of the picker frame are tapered and have forwardly diverging inner edges to form a flaring mouth or entrance for the stalks of standing corn and the space between the points of the tapered gathering portions or arms 14 is sufficient to compensate for and enable the machine to operate on two rows of corn even where the rows are not uniformly spaced. The gathering mechanism comprises in its construction outer and inner endless chains 23 and 24 having inner flights extending along the inner edges of the sides or sections of the picker frame both at the flaring mouth or entrance and at the parallel inner edges 25 which define the space between the sides of the picker frame.

The endless chains 23 and 24 are provided with projecting fingers 26 which move rearwardly at the space between the sides of the picker frame and are adapted to carry the standing stalks rearwardly into the space between the sides of the picker frame to a pair of corn gathering and snapping rolls. The inner endless chain 24 is arranged on sprocket wheels 27, 28 and 29. The sprocket wheels 27 and 29 are located at the ends of the gathering mechanism and the sprocket wheel 28 is arranged adjacent to the front end of the straight longitudinal edge 25 to provide a continuous inner flight the entire length of the front picking portions of the picker and snapping rolls. The outer endless sprocket chain 23 is arranged on end sprocket wheels 30 and 31 and intermediate sprocket wheels 32 located respectively at the front end of the straight edge 25 of the adjacent side of the picker frame and at a point intermediate of the ends of the said straight edge 25 to shorten the inner longitudinal flight of the gathering chain 23.

The end sprocket wheel 29 of the gathering chain 24 is mounted on a short shaft 32$^a$ journaled in suitable bearings of the picker frame and provided with a bevel pinion 33 which meshes with a bevel gear 34 of an inner longitudinal shaft 35. The end sprocket wheel 31 of the outer sprocket chain 23 is mounted on a short shaft 36 provided with a bevel pinion 37 which meshes with a bevel gear 38 of an outer longitudinal shaft 39.

The longitudinal shafts 39 extend to the rear end of the picker frame and motion is transmitted to them from the gathering and snapping rolls which have intermeshing spur gear wheels 40 and 41. The spur gear wheel 40 which meshes with the gear wheel 41 also meshes with a spur gear 42 mounted on the rear end of the inner longitudinal shaft 35. The outer gathering and snapping roll is provided at its rear end with a shaft extension 43 and the latter is connected by sprocket gearing 44 with the rear end of the outer longitudinal shaft 39. The endless chains of the gathering mechanism are housed within suitable spaces 45 and 46 provided in the sides of the picker frame as clearly illustrated in Fig. 5 of the drawings. These housings for endless chains of the gathering mechanism may, of course, be formed in any desired manner as will be readily understood, upper and lower plates being illustrated in the accompanying drawings for this purpose.

The gathering and snapping rolls which are located at opposite sides of the intervening space between the sides of the gathering frame consist of front spiral fluted picker portions 47 and rear snapping portions 48. The front spiral fluted gathering portions coact with the fingers of the gathering mechanism and feed or convey the stalks rearwardly toward the snapping sections of the said rolls and are tapered as shown so that the stalks are gradually confined in the spiral flutes and are positively carried one at a time rearwardly to the snapping portions of the rolls. The snapping portions of the rolls snap the ears from the stalks which move downwardly and rearwardly between the inclined rolls and are left standing in the field while the ears fall into a trough 49 of a side conveyor.

The rear snapping portion of each roll is designed to be constructed of rubber or other suitable material to obtain the desired friction and also to present a more or less yieldable surface to the stalks so that the latter will readily pass between the snapping portions of the rolls while the ears are snapped from the stalks. The rear snapping section 48 is in the form of a sleeve and is mounted on a shaft 49$^a$ preferably rectangular in cross section and formed integral with and extending upwardly and rearwardly from the spiral fluted picker section of the roll. The gathering section may be constructed of any suitable material and the shaft 49$^a$ also receives the spur gear which meshes with the spur gear of the other roll. The front spiral fluted gathering portion is provided at its front end with a suitable journal 50 which is mounted in a suitable bearing of the picker frame. The snapping sections 48 of the rolls are arranged in contact with each other and the axis of the inner roll is located slightly above the plane of the axis of the outer roll so that the ears snapped from the stalks by the rolls will fall into the conveyor trough 49 which extends along the snapping portion of the outer roll.

The inner gathering and snapping rolls are provided with shaft extensions 51 which are connected by universal joints 52 with extensible shafts 53 composed of telescoping sections 54 and 55 and provided at their rear ends with bevel pinions 56 meshing with bevel pinions 57 of a transverse driving shaft 58.

The shaft extensions 51 and the extensible shafts 53 are disposed longitudinally of the machine and the universal joint and the extensible shaft cooperate in permitting the adjustment of the pivotally mounted corn pickers to enable the same to be raised and lowered by the said lifting mechanism. The universal joint 52 may be of any preferred construction and the shaft section 54 is tubular and provided with a bore 59 rectangular in cross section to receive a squared portion 60 of the shaft section 55. The bevel gears 56 and 57 are mounted in suitable sectional casings 61 of any preferred construction. The rear ends of the extensible shafts 53 are journaled in the casings 61. The power shaft 58 is journaled in suitable bearings 62 and it extends across the tractor frame and projects laterally from opposite sides thereof, the bearings 62 being mounted on the tractor frame at opposite sides of the same as clearly indicated in Fig. 7 of the drawings. The power or driving shaft 58 has mounted on it a large gear wheel 63 which meshes with a gear wheel 64 mounted on the pulley shaft or power shaft 65 of the tractor which is adapted to furnish abundant power for operating the mechanism of the two row corn picker and also for propelling the machine.

The side conveyor troughs 49 which are located at opposite sides of the machine are inclined and extend upwardly and rearwardly from the snapping portions of the rolls as clearly illustrated in Figs. 1 and 2 of the drawings.

The snapped ears are carried upwardly along the side conveyor troughs by endless chains 66 mounted on upper and lower sprocket wheels 67 and 68 and provided with conveyor members 69 disposed transversely of the conveyor troughs and consisting of a plurality of spaced fingers formed integral with the transverse connecting bar 70. The transverse connecting bar 70 is centrally secured to a link of the sprocket chains and the conveyor members 69 are of a width to extend substantially across the conveyor troughs and carry the snapped ears upwardly for delivering the same into the upper ends of a pair of transverse chutes 71. The lower front sprocket wheels 68 are mounted on short transverse shafts 72 journaled in suitable bearings of the troughs 49 which constitute the frames of the side conveyors. The upper rear sprocket wheels 67 are mounted on an upper rear transverse shaft 73 extending entirely across the machine and having its terminal portions disposed transversely of the upper ends of the troughs of the side conveyors as clearly illustrated in Fig. 1 of the drawings. The upper rear transverse shaft 73 is provided at one side of the tractor with a sprocket wheel 74 which is connected by a sprocket chain 75 with a sprocket wheel 76 mounted on the transverse power shaft 58 whereby motion is transmitted from the power shaft 58 to the endless chains of the side conveyors.

The transversely disposed chutes 71 are inclined downwardly and inwardly and extend from the point beneath the rear ends of the side conveyors to a lower central outlet 77 which is in the form of a spout and which discharges into the lower end of a rear conveyor 78.

The transversely disposed inclined chutes 71 form an approximately Y-shaped structure for delivering the ears of corn to the rear conveyor and the upper ends of the inclined chutes 71 are open at the front sides at the rear ends of the side conveyors to permit the said side conveyors to deliver the ears to the transverse chutes 71 as clearly illustrated in Fig. 2 of the drawings. The side conveyors and the transverse chutes are rigidly mounted on and are carried by the tractor frame and they may be mounted on the tractor frame in any desired manner as will be readily understood. The ears of corn discharged into the upper ends of the inclined chutes 71 slide down the same and pass through the outlets 77 and fall into the rear conveyor.

The rear conveyor 78 consists of an inclined conveyor trough 79 and an endless chain 80 which is provided at intervals with conveyor members 81. The trough 79 is provided at its lower end with depending ears 82 which are connected by suitable pivots 83 to the sides of an approximately U-shaped bracket 84. The U-shaped bracket 84 which is composed of spaced sides and a bottom connecting portion is pivoted by a vertical bolt 85 or other suitable pivot to a transverse bar or member 86 carried by the frame of the tractor as clearly illustrated in Fig. 6 of the drawings.

The frame of the tractor supports braces or bars 87 and 88 to which the inclined conveyor chutes are secured. The pivots 83 and 85 permit the rear conveyor to swing upwardly and downwardly to raise and lower it to position it properly with relation to a wagon 89 into which the corn is to be delivered. The horizontal pivots 83 form the hinge connection for raising and lowering the rear conveyor and a vertical pivot 85 permits lateral movement of the rear conveyor from one side to the other to form a flexible connection between the rear conveyor and the tractor so that there will be no straining of the parts when the machine moves forwardly and draws the wagon 89 with it while the said wagon is being loaded with the snapped ears. The endless chain of the rear conveyor is arranged on upper and lower sprocket wheels 90 and 91 and one of the flights of the chain 80 with the conveyor members 81 moves upwardly and rearwardly over the bottom of the trough 79 and the ears of corn are carried upwardly and discharged at the upper rear end of the trough 79 and fall into the wagon 89. The sprocket wheel 90 is mounted on a front transverse shaft 92 which is journaled in suitable bearings of the conveyor trough 79 and the lower sprocket wheel 91 is mounted on the inner end of a lower transverse shaft 93 provided with universal joints 94 and having a telescopic extensible portion 95. The lower rear transverse shaft 93 is journaled at its inner end in the suitable bearings of the conveyor trough 29 and at its outer end in suitable bearings 96 and has mounted on its outer end a sprocket wheel 97 which is connected by a sprocket chain 98 with a sprocket wheel 99 of the upper rear transverse shaft 73.

The sprocket gearing extending from the upper rear transverse shaft 73 to the lower rear transverse shaft 93 transmits motion from the said shaft 73 to the rear conveyor and the universal joint 94 and the telescopic connection 95 which are constructed similar to the universal joint 52 and the telescopic connection or extensible shaft connection heretofore described permit the vertical and lateral pivotal movement of the rear conveyor without the same affecting the means for transmitting motion from the tractor to the endless chain of the rear conveyor.

The wagon is provided at its front end with vertical standards 100 between which the upper end of the rear conveyor is arranged and the said rear conveyor is provided at its upper rear portion with a guard composed of longitudinal side bars 101 spaced from the sides of the trough by transverse rods 102 and 103 which are connected intermediate of their ends with the conveyor trough. The side bars of the rear conveyor guard are adapted to contact with the standards 100 and therefore limit the lateral movement of the rear conveyor so that the upper discharge end thereof will always be over the body of the wagon in position for discharging the ears of corn into the same. The rear conveyor is yieldably supported in an inclined position by a spring 104 connected at its front end to the tractor adjacent the driver's seat 4 and connected at its rear end with the rear conveyor by a connecting member 105 which is preferably in the form of a bail.

The wagon is connected with the tractor by means of a draw bar 106 which may be of any suitable construction and which is provided at its ends with suitable couplings for connecting it to the wagon and to the tractor. As the wagon is connected to the tractor and is located directly in rear of the machine there are no down rows of corn at any stage of the operation of the machine and loss incident to such down rows is prevented. The side bars 101 and the transverse connecting rods 102 and 103 of the guard of the rear conveyor are spaced from the lower flight of the endless chain 80 and the conveyor members 81 of the said flight by the connecting member 105 and short connecting bars 107. The connecting member 105 is composed of spaced sides and a top connecting portion and the sides of the connecting member 105 and the short connecting bars 107 depend from the trough of the rear conveyor and are suitably secured to the transverse bars 102 and 103.

What is claimed is:

1. A two row corn picker including a tractor, corn pickers pivotally mounted on the tractor at opposite sides thereof and provided with gathering mechanism and having snapping rolls, side conveyors fixed to the tractor at opposite sides of the same and arranged to receive the ears of corn from the corn pickers and extending rearwardly therefrom, the corn pickers being movable upwardly and downwardly independently of the side conveyors, a central longitudinally disposed rear conveyor arranged to discharge at the rear of the machine and means for transferring the ears of corn from the side conveyors to the rear conveyor.

2. A two row corn picker including a tractor, corn pickers pivotally mounted on the tractor at opposite sides thereof and having gathering mechanism and provided with snapping rolls, relatively stationary side conveyors carried by the tractor and arranged to receive the ears from the snapping rolls, a central longitudinally disposed rear conveyor arranged to discharge at the rear of the machine and transversely disposed means extending from the rear ends of the side conveyors to the front end of the rear conveyor and having a central outlet for transferring the ears of corn from the side conveyors to the rear conveyor.

3. A two row corn picker including a tractor, corn pickers pivotally mounted on the tractor at opposite sides thereof and having gathering mechanism and provided with snapping rolls, relatively stationary side conveyors carried by the tractor and arranged to receive the ears from the snapping rolls, a central longitudinally disposed rear conveyor arranged to discharge at the rear of the machine, and transversely disposed chutes extending from the rear ends of the side conveyors and provided with a central outlet arranged to discharge into the front end of the rear conveyor for delivering the ears of corn from the side conveyors to the rear conveyor.

4. A two row corn picker including a tractor, corn pickers pivotally mounted on the tractor at opposite sides thereof and having gathering mechanism and provided with snapping rolls, relatively stationary side conveyors carried by the tractor and arranged to receive the ears from the snapping rolls, a central longitudinally disposed rear conveyor arranged to discharge at the rear of the machine, and transversely disposed inclined chutes extending downwardly and inwardly from the rear ends of the side conveyors and having connected lower ends provided with a central discharge spout arranged to deliver the ears of corn to the rear conveyor.

5. A two row corn picker including a tractor, corn pickers pivotally mounted on the tractor at opposite sides thereof and having gathering mechanism and provided with snapping rolls, relatively stationary side conveyors carried by the tractor and arranged to receive the ears from the snapping rolls, a central longitudinally disposed rear conveyor arranged to discharge at the rear of the machine, and inwardly inclined transverse chutes extending from the rear ends of the side conveyors and having their upper ends open at the front to receive the ears from the side conveyors and provided at their lower ends with a common central outlet discharging into the rear conveyor.

6. A two row corn picker including a tractor, corn pickers pivotally mounted at opposite sides of the tractor and carried by the same and provided with snapping rolls, relatively stationary side conveyors fixed to and carried by the tractor and located at the outer sides of the corn pickers and arranged to receive the ears from the snapping rolls, said side conveyors extending rearwardly from the corn pickers, and transverse chutes located at the rear ends of the side conveyors and extending downwardly and inwardly therefrom and having a common central outlet.

7. A two row corn picker including a tractor, pivotally mounted corn pickers located at opposite sides of the tractor and carried by the same and provided with snapping rolls, relatively stationary side conveyors arranged to receive the ears of corn from the snapping rolls and extending rearwardly from the corn pickers, and a pair of transversely disposed inclined chutes arranged to receive the ears from the rear ends of the side conveyors and provided with a common central discharge spout located at the back of the tractor.

8. A two row corn picker including a tractor, pivotally mounted corn pickers carried by the tractor and located at opposite sides thereof, and provided with snapping rolls, relatively stationary side conveyors extending rearwardly from the corn pickers and arranged to receive the ears from the snapping rolls, a central longitudinally disposed inclined rear conveyor arranged to discharge at the rear of the tractor, means for mounting the front end of the rear conveyor for vertical and lateral pivotal movement, and means for conducting the ears of corn from the side conveyor and for delivering the ears into the front end of the rear conveyor, the latter means having a central outlet discharging into the rear conveyor.

9. A two row pivotally mounted corn picker including a tractor, corn pickers carried by the tractor and located at opposite sides thereof, and provided with snapping rolls, fixed side conveyors extending rearwardly from the corn pickers and arranged to receive the ears from the snapping rolls, the corn pickers being movable upwardly and downwardly independently of the side conveyors, transversely disposed chutes arranged to receive the ears of corn from the side conveyors and having a central common discharge outlet, a central longitudinally disposed inclined rear conveyor arranged to receive the ears of corn from the said outlet of the chutes and arranged to deliver the ears at the rear of the tractor, and means for mounting the front end of the rear conveyor for vertical and lateral pivotal movement.

10. A two row corn picker including a tractor, pivotally mounted corn pickers carried by the tractor and located at opposite sides thereof and provided with snapping rolls, fixed side conveyors extending rearwardly from the corn pickers and arranged to receive the ears from the snapping rolls, the corn pickers being movable upwardly and downwardly independently of the side conveyors, transversely disposed chutes arranged to receive the ears of corn from the side conveyors and having a central common discharge outlet, a central longitudinally disposed inclined rear conveyor arranged to receive the ears of corn from the said outlet of the chutes and arranged to deliver the ears at the rear of the tractor, and a bracket pivotally mounted at the bottom for movement on the vertical axis and having spaced sides pivotally connected with the front end of the rear conveyor for permitting pivotal movement of the latter on a horizontal axis.

11. A two row corn picker including a tractor, pivotally mounted corn pickers located at opposite sides of the tractor and carried by the same and provided with snapping rolls geared together, fixed side conveyors mounted at opposite sides of the tractor and arranged to receive the ears from the snapping rolls, the corn pickers being movable upwardly and downwardly independently of the side conveyors, a transverse power shaft mounted on the tractor and driven by the same, said power shaft extending from opposite sides of the tractor, longitudinally disposed extensible shafts located at opposite sides of the tractor and having universal joints and connected at the front end with the snapping rolls, and gearing connecting the rear ends of the extensible shafts with the power shaft.

12. A two row corn picker including a tractor, pivotally mounted corn pickers located at opposite sides of the tractor and carried by the same and provided with snapping rolls geared together, fixed side conveyors mounted at opposite sides of the tractor and arranged to receive the ears from the snapping rolls, the corn pickers being movable upwardly and downwardly independently of the side conveyors, a transverse power shaft mounted on the tractor and driven by the same, said power shaft extending from opposite sides of the tractor, longitudinally disposed extensible shafts located at opposite sides of the tractor and having universal joints and connected at the front end with the snapping rolls, gearing connecting the rear ends of the extensible shafts with the power shaft, and gearing casings receiving the extended ends of the power shaft and the rear ends of the extensible shafts and the gearing for connecting the same.

13. A two row corn picker including a tractor, pivotally mounted corn pickers located at opposite sides of the tractor and carried by the same and having snapping rolls geared together, a transverse power shaft mounted on the tractor and driven by the same and extending laterally from opposite sides of the said tractor, longitudinally disposed flexible shafts connected at their front ends with the snapping rolls, gearing connecting the rear end of the flexible shafts with the extended ends of the power shaft, side conveyors fixed to the tractor and extending rearwardly from the corn pockers and arranged to receive the ears of corn therefrom and having endless chains, the corn pickers being movable upwardly and downwardly independently of the side conveyors, a rear transverse shaft extending across the tractor and provided at its ends with sprocket wheels meshing with the said chains of the side conveyors for operating the latter, and gearing connecting the rear transverse shaft with the said power shaft.

14. The combination with a wagon having standards, of a two row corn picker including a tractor located in advance of the wagon, corn pickers located at opposite sides of the tractor, side conveyors extending rearwardly from the corn pickers, a centrally arranged rear conveyor, means for delivering the ears of corn from the side conveyors to the rear conveyor, and a rear guard carried by the rear conveyor and having spaced side bars arranged to operate between the standards of the wagon.

15. The combination with a wagon having front standards, of a two row corn picker including a tractor located in advance of the wagon, corn pickers located at opposite sides of the tractor, side conveyors extending rearwardly from the corn pickers, an inclined centrally arranged rear conveyor carried by the tractor and mounted for lateral pivotal movement, means for delivering ears of corn from the side conveyors to the rear conveyor, and a guard carried by the upper end of the rear conveyor and composed of side bars and connecting cross bars, said guard being adapted to rest upon the wagon between the front standards thereof for limiting the lateral movement of the rear conveyor.

16. The combination with a wagon having front standards, of a two row corn picker including a tractor located in advance of the wagon, corn pickers located at opposite sides of the tractor, side conveyors extending rearwardly from the corn pickers, an inclined centrally arranged rear conveyor carried by the tractor and mounted for lateral pivotal movement, means for delivering ears of corn from the side conveyors to the rear conveyor, a guard carried by the upper end of the rear conveyor and composed of said bars and connecting cross bars, said guard being adapted to rest upon the wagon between the front standards thereof for limiting the lateral movement of the rear conveyor, and means depending from the rear conveyor for offsetting the said guard from the rear conveyor.

17. The combination with a wagon of a corn picker including a tractor located in advance of the wagon, a centrally arranged inclined rear conveyor carried by the tractor and pivotally connected with the same for vertical movement, and means including a spring for connecting the upper portion of the rear conveyor with the tractor for yieldably supporting the rear conveyor upon the wagon.

18. The combination with a wagon having front standards, of a corn picker including a tractor located in advance of the wagon, a centrally arranged inclined rear conveyor carried by the tractor and pivotally connected with the same for vertical movement, means including a spring for connecting the upper portion of the rear conveyor with the tractor for yieldably supporting the rear conveyor upon a wagon, and a guard carried by the rear portion of the said conveyor and arranged to rest upon the wagon between the front standards thereof and having side portions offset from the conveyor and adapted to limit lateral movement of the conveyor.

In testimony whereof we have hereunto set our hands, this 11 day of July, 1928.

EARL GLOVER.
LOYD GLOVER.
REX GLOVER.